March 10, 1964 P. E. PEARSON, JR., ETAL 3,123,974
TEMPERATURE CONTROL SYSTEM WITH VARIABLE DYNAMIC RESPONSE
Filed June 30, 1959 2 Sheets-Sheet 1
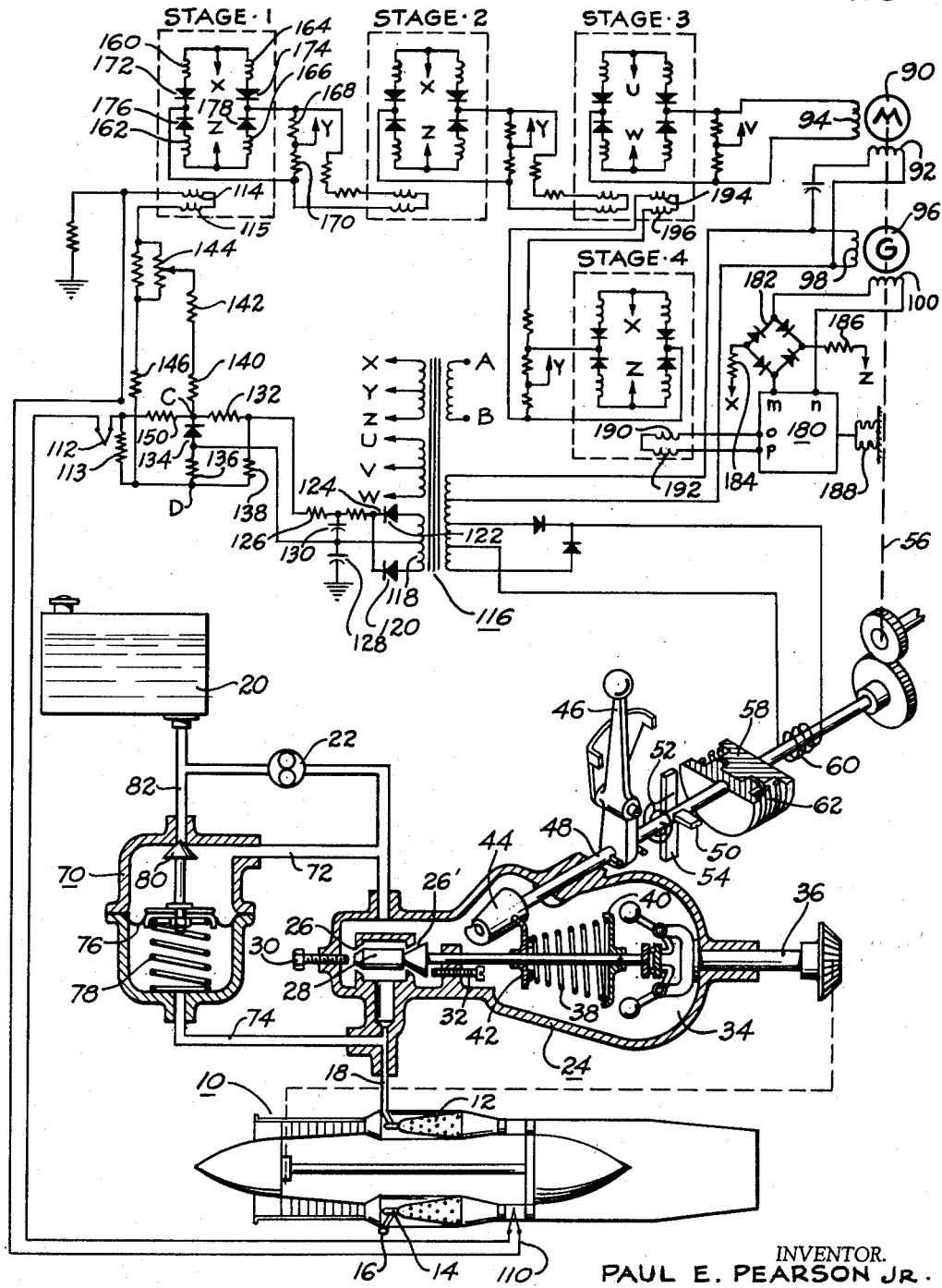
FIG_1
INVENTOR.
PAUL E. PEARSON JR.
DONALD A. REYNICK
BY
Robert C. Smith
ATTORNEY.

March 10, 1964 P. E. PEARSON, JR., ETAL 3,123,974
TEMPERATURE CONTROL SYSTEM WITH VARIABLE DYNAMIC RESPONSE
Filed June 30, 1959 2 Sheets-Sheet 2
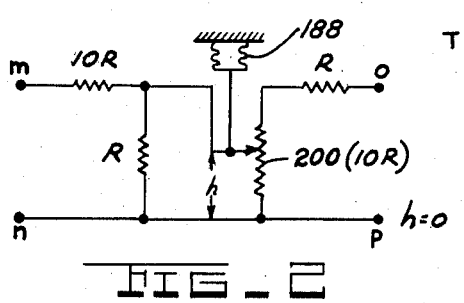
FIG_2
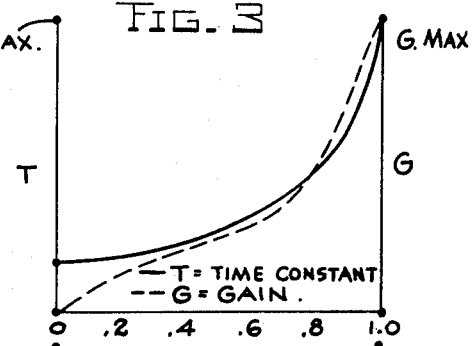
FIG.3
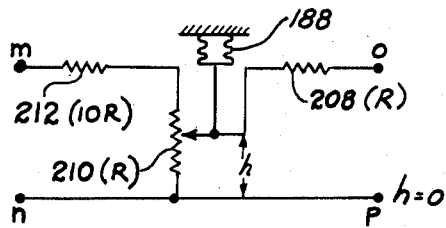
FIG_4
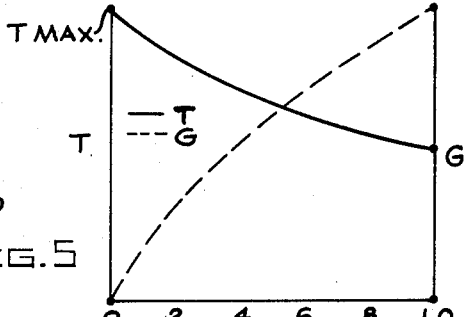
FIG.5
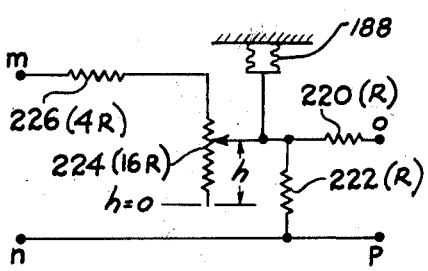
FIG_6
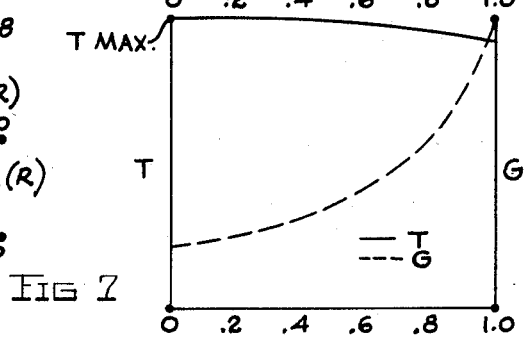
FIG.7
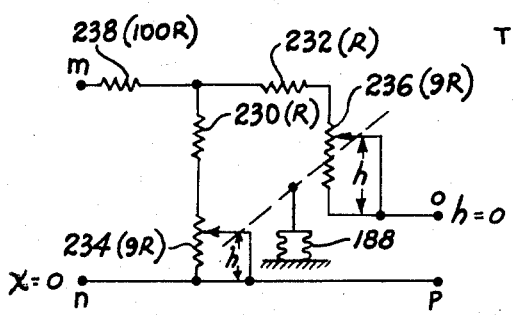
FIG_8
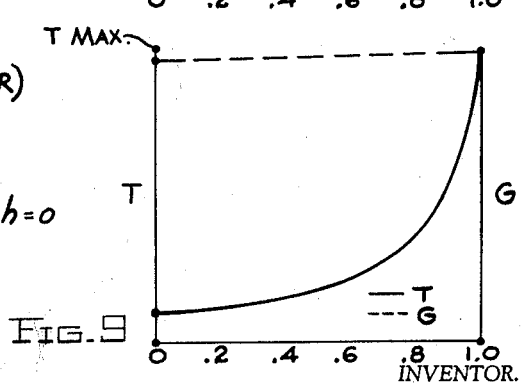
FIG.9
INVENTOR.
PAUL E. PEARSON JR.
DONALD A. REYNICK.
BY
*Robert C. Smith*
ATTORNEY.

United States Patent Office 3,123,974
Patented Mar. 10, 1964

3,123,974
TEMPERATURE CONTROL SYSTEM WITH VARIABLE DYNAMIC RESPONSE
Paul E. Pearson, Jr., and Donald A. Reynick, South Bend, Ind., assignors to The Bendix Corporation, a corporation of Delaware
Filed June 30, 1959, Ser. No. 824,068
6 Claims. (Cl. 60—39.28)

This invention relates to control systems and more particularly to an electro-mechanical system involving specialized electrical means for effecting dynamic stabilization of the entire system and for varying the dynamic response of the system with changes in certain operating conditions.

Many control devices presently in use require cooperating mechanical and electrical components which, when combined with the instrumentality being controlled, introduce problems as to reliability, accuracy and system stability. One application for such devices is that of engine controls for aircraft where excellent performance and reliability must be provided in spite of weight limitations and environmental conditions involving severe heat and vibration. Electrical systems have certain advantages, particularly as to speed of response and accuracy which makes them highly desirable for such applications and the magnetic amplifier has been especially favored because of its excellent reliability record. This is particularly true in the case of temperature controls because the sensing means usually employed is a thermocouple having a very low level direct current output which is readily amplified by means of a magnetic amplifier. Fuel controls for aircraft typically involve a significant amount of hydromechanical apparatus including springs, diaphragms, bellows, and servo valves, all of which have measurable spring rates, inertias, and damping coefficients which may coact to produce a dynamic response characteristic which does not match or complement the response characteristic of the associated engine. Unless corrected for, this situation will result in unstable operation, perhaps oscillation, of the engine-control combination. Where part of the control system is electrical it is usually easier to correct for a dynamic inadequacy by designing a small electrical network to provide the necessary compensation than it is to redesign mechanical components. In the case of engines for aircraft, an additional complication is involved because the dynamic characteristics of the components vary somewhat with the change in density of the air flowing through the engine and this cannot always be corrected for adequately through the use of density compensating means acting directly on fuel flow. It is therefore an object of the present invention to provide a control system for aircraft engines in which electrical means are provided for matching the dynamic response characteristic of the control to that of the engine including means for altering the dynamic response characteristics of the control with changes in altitude.

It is another object of the present invention to provide a fuel control system for aircraft engines in which a mechanical governing system is subject to an override from a temperature limiting system acting on the speed request means.

It is another object to provide a control system in which a low level direct current control signal is amplified through a multi-stage magnetic amplifier to control an electro-responsive means and a feedback signal from said electro-responsive means is amplified through an additional amplifier stage connected to the input of the stage driving said electro-responsive means, to provide a long "lagging" time constant which appears as a "leading" time constant for stabilization.

It is another object to provide a control system which accomplishes the above object and which includes means for varying the gain and/or the time constant of the feedback signal with changes in an additional variable condition.

Other objects and advantages will become apparent from consideration of the following specification taken in connection with the accompanying drawings in which:

FIGURE 1 is a schematic drawing of a fuel system for a gas turbine engine embodying our invention including an all-speed governor and an electrically controlled temperature limiting system.

FIGURE 2 is a schematic drawing of a stabilization circuit for use with the system of FIGURE 1 wherein both the gain and the time constant of the feedback signal are increased with altitude.

FIGURE 3 is a graph showing the manner in which the gain and time constant of the device of FIGURE 2 vary with altitude.

FIGURE 4 is a schematic drawing of a stabilization circuit for use with the system of FIGURE 1 in which the gain increases and the time constant decreases with altitude.

FIGURE 5 is a graph showing the manner in which the gain increases and the time constant decreases with altitude in the device of FIGURE 4.

FIGURE 6 is a schematic drawing of a stabilization circuit for use with the system of FIGURE 1 in which the gain increases and the time constant remains substantially uniform with increases in altitude.

FIGURE 7 is a graph of gain and time constant variations with altitude for the device of FIGURE 6.

FIGURE 8 is a schematic drawing of a stabilization circuit for use with the system of FIGURE 1 in which the gain remains substantially constant and the time constant increases with altitude.

FIGURE 9 is a graph of gain and time constant variations with altitude for the device of FIGURE 8.

Referring to FIGURE 1 a gas turbine engine is shown generally at numeral 10 having a plurality of combustion chambers 12 having nozzles 14 to which fuel is supplied from a fuel manifold 16. Fuel is supplied from a conduit 18 through which fuel is pressurized from a source 20 by means of a pump. In the conduit 18 is a fuel metering unit 24 which includes a balanced valve assembly consisting of a pair of orifices 26, 26' in conduit 18 and having their effective area controlled by means of a valve member 28. Valve member 28 is limited in its movement in a closing direction by means of a manually adjustable stop 30 and in its opening direction by means of a manually adjustable stop 32. Within this range its effective position is controlled by means of an all-speed governor consisting of a flyweight structure 34 which is driven by an engine driven shaft 36. The force exerted by the speed responsive flyweights 34 is opposed by the force exerted by a governor speeder spring 38 positioned between a retainer 40 and a second retainer 42. The effective compression on the governor speeder spring 38 is varied by means of a three dimensional cam 44 which acts to vary the effective position of retainer member 42. The three dimensional cam 44 is moved axially by means of a manually operated power lever 46 which acts to slide a shaft 48 carrying the cam 44 in an axial direction. For a given position of power lever 46, cam 44 and shaft 48 may be rotated against the action of a spiral spring 50 and within the limits established by a stop 52 which abuts against a stationary member 54 at each extreme of approximately 270° of rotation of the shaft 48. The shaft 48 is connected with an additional mechanical linkage 56 by means of a clutch 58 which is operated in an engaging direction by means of a solenoid structure 60 and is held disengaged in the absence of a signal on the solenoid 60 by means of a spring 62.

A constant pressure drop is maintained across the fuel device 24 by means of a pressure regulator 70 having connecting conduits 72 and 74 connected to conduit 18 upstream and downstream respectively of the metering unit 24. A diaphragm 76 which is spring loaded by means of a spring 78 senses the pressure differential across the metering unit 24 and maintains a fluid pressure differential corresponding to the effective force exerted by the spring 78. The fuel supplied by the pump 22 is always in excess of the requirements of the metering unit 24 and the regulating unit 70 therefore continually acts to by-pass a certain amount of fuel through conduit 72 across a by-pass regulating valve 80 and into a conduit 82 which communicates with pump 22 on its upstream side.

Temperature limiting in the present system is accomplished by means of an electrical system acting through the mechanical connection 56 to effect rotation of the shaft 48 and cam 44 which acts to vary the effective compression of the governor speeder spring 38. Shaft 56 is driven by a motor 90 having a fixed phase winding 92 and a variable phase winding 94. A generator 96 is integrally mounted on the same shaft as is the armature of motor 90 and includes a fixed phase winding 98 and a variable phase winding 100. The turbine inlet or combustion gas temperature in engine 10 is sensed by means of a thermocouple having its hot junction 110 located in the engine where it is exposed to the combustion gas temperature. The cold junction 112 of the thermocouple and a temperature compensating resistor 113 are maintained at the same temperature. A constant current for resistor 113 is provided from a reference voltage measured between terminals C and D. The variation of resistance of 113 with temperature is such that its voltage variation with temperature closely matches that of the cold junction 112. As a result, the sum of the voltages across cold junction 112 and resistor 113 is the compensated thermocouple voltage essentially independent of cold junction temperature. Reference voltage source C, D provides a second constant current through resistor 142 to provide a reference voltage across resistor 146 and potentiometer 144. Varying the slider position of potentiometer 144 varies the reference voltage over a desired range. Any difference between the reference voltage and the compensated thermocouple voltage is an error voltage appearing across signal windings 114 and 115 of stage 1 of the magnetic amplifier. This error voltage produces an error current through said signal windings which has a polarity and magnitude which varies with the sense and extent of departure from the reference of the thermocouple signal. The power supply for the electrical system shown herein is a transformer 116 which receives alternating voltage from an engine driven source, not shown, supplied to the terminals A, B. The voltage source for the reference circuit is a secondary winding 118 having a center tap and having a pair of diodes 120 and 122 connected to each end thereof in a full-wave rectifying arrangement. A pair of resistors 124 and 126 and a capacitor 130 act to filter the output of the diodes thereby providing a smooth direct current signal to the reference circuit. It will be observed that this direct current voltage is supplied through a dropping resistor 132 to a reference diode 134 which, having Zener characteristics acts as a voltage regulator for the reference circuit. A pair of resistors 136 and 138 are connected to provide a small opposing voltage to buck out the slight voltage variations in diode 134 resulting from fluctuations in power supply voltage. Reference voltage supply C, D is thereby rendered insensitive to power supply variations.

Stages 1, 2 and 4 of the magnetic amplifier operate in essentially the same manner; therefore, only stage 1 of this group will be described in detail. Referring to the power transformer 116 it will be observed that one of the secondary windings has terminals X and Z and a center tap Y. These terminals are connected to the corresponding points on the magnetic amplifier as shown. This particular voltage source is supplied to energize the power or gate windings of stages 1, 2 and 4. Stage 3, which is the output stage, requires a higher voltage level and it is connected to the secondary winding U, W having a center tap V in a manner identical to the other stages. Winding X, Z is also connected across the demodulator in the output of the damping generator 96. With reference to stage 1 the power windings 160 and 162 are wound on a pair of cores and are energized during alternate half cycles of the supply voltage. Similarly, windings 164 and 166 are wound on a second pair of cores and are energized during alternate half cycles of the supply voltage. The direct current control windings 114 and 115 are wound on the separate pairs of cores such that energizing of winding 114 will affect the saturation of the cores carrying windings 160 and 162 and energizing of winding 115 will affect the saturation of the cores carrying windings 164 and 166. A pair of load resistors 168 and 170 are connected across the output of the first stage and to the center tap Y of the transformer winding. When the terminal X is positive and the terminal Z is negative, the windings 160 and 164 will each be conducting because the instantaneous polarity of the voltage applied thereacross is that which would be conducted by the corresponding diodes 172 and 174. The voltage across the windings 162 and 166 is opposed by the corresponding diodes 176 and 178; consequently, only a small leakage current flows through windings 162 and 166. In the absence of a control signal appearing on windings 114 and 115, identical voltages will be developed across the load resistors 168 and 170 which, being opposing, result in no output signal from the stage. Let us suppose, that under these conditions, however, an error voltage is supplied from the temperature reference system and is impressed across control windings 114 and 115, of such polarity as to drive the core carrying winding 160 into saturation earlier in the half cycle and the core carrying winding 164 into saturation later in the half cycle. When the core carrying power winding 160 becomes saturated, the voltage drop across winding 160 is reduced and the greater part of the voltage half cycle appears across resistor 170. The voltage drop across the winding 164 remains substantial over most of the same half cycle of the power supply, and a smaller part of this half cycle appears across the load resistor 168. There will therefore be an output from stage 1 of the same polarity as the voltage across resistor 170 which is supplied to the signal windings of stage 2, as an input. Should the output of the temperature reference circuit be of the opposite polarity, the core carrying winding 160 will become saturated later in the half cycle and the core carrying windings 164 will be driven into saturation earlier in the half cycle and the opposite polarity of output will result. In the opposite half cycle of the power supply an entirely analogous operation occurs with respect to the windings 162 and 166 and their respective cores.

The output of stage 3 is an alternating current having a magnitude and phase dependent upon the magnitude and polarity of the temperature error voltage and is supplied to the variable phase winding 94 of the two-phase motor 90. Those skilled in the art will recognize that magnetic amplifiers of the type shown and described herein may be made to have either alternating current or direct current outputs depending upon the direction in which the signal windings are wound to aid or oppose the flux generated by the gate winding. As motor 90 rotates, it also rotates generator 96 and, through the mechanical connection 56, the shaft 48, so long as the solenoid 60 is energized and the clutch 58 is engaged. As generator 96 is rotated a voltage is generated in winding 100 which is directly proportional to the velocity of rotation of the generator and the motor 90. This damping generator voltage is supplied to input terminals $m$, $n$ a modifying circuit 180 through a half-wave demodulator 182. Two opposite terminals of the bridge 182 are connected to the power transformer terminals X, Z through a pair of dropping resistors 184 and 186. This demodulator is a half-wave device which is apparent from the fact that the diodes in the rectifier bridge are all connected to the conducting only when the voltage is positive at X with respect to Z. In this manner the alternating current output of the variable phase winding 100 of generator 96 is demodulated and only a pulsating direct current signal is supplied to the modifying circuit 180. The input to circuit 180 is a damping signal for stabilizing the entire system which is subject to modification by means of an altitude responsive bellows 188 which is connected to alter electrical values within the circuit 180. A number of alternative forms for circuit 180 are discussed below. The output of this circuit from terminals $o, p$ is applied to a pair of signal windings 190 and 192 of stage 4 of the magnetic amplifier. This stage which operates in a manner identical to stage 1, amplifies this damping or stabilizing signal and the output of this stage is supplied as an additional input signal to stage 3 on control windings 194 and 196. Inasmuch as the output of stage 4 is a stabilization or damping signal, the polarity of the signal applied to stage 3 is in opposition to the input from stage 2. Thus is provided feedback signal having a long "lagging" time constant which appears as a "leading" time constant for stabilization.

As set forth above, circuit 180 contains one of a plurality of different resistance networks capable of providing the desired dynamic response characteristics for the control system which will most nearly complement the response characteristic of the associated engine as it varies in altitude. It will also be apparent that the system herein described is generally useful in a control system which responds to changes in a first variable condition and in which the dynamic response characteristic may vary in response to changes in a second variable condition. The circuits set forth in FIGURES 2, 4, 6 and 8 represent configurations which may be connected into the system of FIGURE 1 in the location of box 180 for providing a number of different response characteristics. These are examples only and are not meant to be all-inclusive.

The circuit of FIGURE 2 produces increases in both gain (G) and time constant (T) of the feedback signal with altitude ($h$) as shown in FIGURE 3. The time constant is equal to the effective control winding inductance of the feedback loop divided by the total control circuit resistance. The total control circuit resistance includes the effective resistance of the resistance network plus the resistance of the stage 4 control windings. Inasmuch as the inductance is fixed, these changes are brought about through the action of the altitude bellows 188 which acts to position the slider of a potentiometer 200 to vary the effective control circuit resistance of the network. As altitude increases, the distance $h$ increases and the effective control circuit resistance decreases. From the relationship set forth above, it will be apparent that a decrease in the effective resistance will cause an increase in the time constant acting on the feedback signal. Also, the attenuation of the feedback signal by potentiometer 200 will be less and the gain of the feedback loop greater, with increases in altitude.

FIGURES 4 and 5 show a characteristic wherein gain (G) increases with altitude ($h$) and the time constant (T) of the feedback loop decreases. In this case with $h$ at a minimum, the effective resistance will be value R of resistor 208. The time constant is therefore at a maximum. As $h$ increases, this effective control circuit resistance increases until it is approximately 2R. The resistance 10R, while great, is somewhat less than infinity and therefore will introduce some nonlinearity. The time constant drops to approximately half its value at the minimum value of $h$. The gain varies with $h$ in a manner similar to FIGURE 2, the greater nonlinearity of FIGURE 2 being brought about as a result of the effect of having the resistance R in parallel with the potentiometer 200 which varies from zero to 10R.

In the device of FIGURE 6, the control circuit resistance looking from the output terminals back toward the input will be primarily defined by the resistances R of resistors 220 and 222 and will be essentially 2R where $h$ is at a minimum because of the large amount of resistance (16R) of the variable resistor 224 plus the resistance 4R of the resistor 226. With $h$ at a maximum, the effective control circuit resistance drops only slightly and the time constant varies only slightly with altitude. Because of the large resistance of the variable resistor 224 (16R) its effect on the gain of the feedback loop is substantial. As $h$ increases, the amount of series resistance in the circuit decreases proportionately and the gain therefore increases as shown in the curve of FIGURE 7.

FIGURE 8 shows a means of varying the time constant of the feedback loop while leaving the gain essentially constant. In this circuit which has two identical branches with resistors 230 and 232 and ganged potentiometers 234 and 236, respectively, the effective control circuit resistance decreases substantially with increases in $h$ and the time constant therefore increases. The gain, however, remains essentially the same because as $h$ changes, the resistance values and the current relationships in the two branches remain essentially the same and because the effective change in total current will not be great because the resistance changes in the separate branches are small compared with the magnitude 100R of the resistor 238.

While a limited number of embodiments have been shown and described herein, it is recognized that modifications may be made to suit the requirements of any particular application without departing from the scope of the present invention.

We claim:

1. In a fuel control system for a gas turbine engine including a fuel conduit to said engine, a valve in said conduit, an all-speed governor operatively connected to said valve including a speed reference device and an operator-operated means for supplying a request to said device; a temperature limiting system comprising means producing an electrical signal whose magnitude and polarity are determined by the magnitude and sense of the departure in temperature of the combustion gas temperautre from a given temperature, magnetic amplifier means including an output stage for amplifying said electrical signal, a motor driven by said output stage operatively connected to said speed reference device for varying its effective reference value, a rate generator driven by said motor for producing a signal varying with the velocity and direction of rotation of said motor, means for modifying said rate signal, a magnetic amplifier for amplifying said modified rate signal, said amplifier having a substantial effective control winding inductance producing a large lagging time constant, and means for connecting the output of said magnetic amplifier to said output stage to thereby provide to said magnetic amplifier means a stabilizing signal which appears as a leading time constant.

2. A fuel control system as set forth in claim 1 wherein said operative connection between said motor and said speed reference device includes a pair of shafts and a clutch having engaging portions attached to each of said shafts, said clutch being spring-loaded in a normally disengaged position and including a solenoid which is energized when said magnetic amplifier means is energized to cause said portions to become engaged.

3. A fuel control system as set forth in claim 1 wherein said means for modifying said rate signal includes variable resistance means and means responsive to an engine operating condition for varying the output of said variable resistance means.

4. In a fuel control system for a gas turbine engine including a fuel conduit to said engine, a valve in said conduit, an all-speed governor operatively connected to said valve including a speed reference device and an operator-operated means for supplying a request to said device: a limiting system comprising means producing an electrical signal whose magnitude and polarity are determined by the magnitude and sense of the departure of a condition of engine operation from a reference value, amplifier means including an output stage for amplifying said electrical signal, a motor driven by said output stage operatively connected to said speed reference device for varying its effective reference value, a rate generator driven by said motor for producing a signal varying with the velocity and direction of rotation of said motor, means for modifying said rate signal, an amplifier for amplifying said modified rate signal including inductance means producing a substantial lagging time constant, and means for connecting the output of said amplifier to said output stage to thereby provide to said amplifier means a stabilizing signal which appears as a leading time constant.

5. A fuel control system as set forth in claim 4 wherein said means for modifying said rate signal includes variable resistance means and means responsive to an engine operating condition for varying the output of said variable resistance means.

6. In an electrical control system, means producing a voltage signal whose magnitude and polarity are determined by the magnitude and direction of the departure of the sensed condition from the reference value, magnetic amplifier means including an output stage having input signal windings and feedback signal windings for amplifying said voltage signal, motor means driven by said output stage and means driven by said motor means effective to vary the value of said sensed condition, a rate generator driven by said motor means producing an output signal varying as a function of an instantaneous rate of change of said voltage signal, means responsive to a second variable condition for modifying said rate generator output signal, a magnetic amplifier for amplifying said modified rate generator signal, said amplifier having a substantial effective control winding inductance producing a large lagging time constant, and means connecting the output of said magnetic amplifier to said feedback windings to thereby provide to said magnetic amplifier means a stabilizing signal which appears as a leading time constant.

References Cited in the file of this patent

UNITED STATES PATENTS

| | | |
|---|---|---|
| 2,694,900 | Brandau | Nov. 23, 1954 |
| 2,766,584 | Stockinger | Oct. 16, 1956 |
| 2,777,069 | Saeman | Jan. 8, 1957 |
| 2,790,303 | Kutzler | Apr. 30, 1957 |
| 2,812,485 | Schieber | Nov. 5, 1957 |
| 2,832,017 | Evans | Apr. 22, 1958 |
| 2,880,580 | Wallace et al. | Apr. 7, 1959 |

FOREIGN PATENTS

| | | |
|---|---|---|
| 714,053 | Great Britain | Aug. 25, 1954 |